No. 891,691. PATENTED JUNE 23, 1908.
P. GRUNDMANN.
MACHINE FOR DISTRIBUTING ARTIFICIAL MANURE, LIME, OR THE LIKE.
APPLICATION FILED OCT. 9, 1906.

2 SHEETS—SHEET 1.

Witnesses:
Wilhelm Schmidt
Albert Fleischer

Inventor:
Paul Grundmann

No. 891,691. PATENTED JUNE 23, 1908.
P. GRUNDMANN.
MACHINE FOR DISTRIBUTING ARTIFICIAL MANURE, LIME, OR THE LIKE.
APPLICATION FILED OCT. 9, 1906.

2 SHEETS—SHEET 2.

Witnesses:
Wilhelm Schmidt
Albert Fleischer.

Inventor:
Paul Grundmann

UNITED STATES PATENT OFFICE.

PAUL GRUNDMANN, OF OSTRAU, GERMANY.

MACHINE FOR DISTRIBUTING ARTIFICIAL MANURE, LIME, OR THE LIKE.

No. 891,691.

Specification of Letters Patent.

Patented June 23, 1908.

Application filed October 9, 1906. Serial No. 338,132.

*To all whom it may concern:*

Be it known that I, PAUL GRUNDMANN, a subject of the German Emperor, residing at Ostrau, Saxony, Germany, have invented certain new and useful Improvements in Machines for Distributing Artificial Manure, Lime, or the Like, of which the following is a specification.

This present invention relates to improvements in machines for distributing artificial manure, lime, or the like over a large surface or over separate rows in a uniformly thick layer. This uniform distribution is attained by the material in the hopper being continuously distributed over the ground by means of the lower one of two worms of an endless screw, which receives its motion from the axle of the vehicle.

In the accompanying drawings in which I have illustrated my improved machine like figures of reference refer to like parts throughout the different views.

Figure 1:
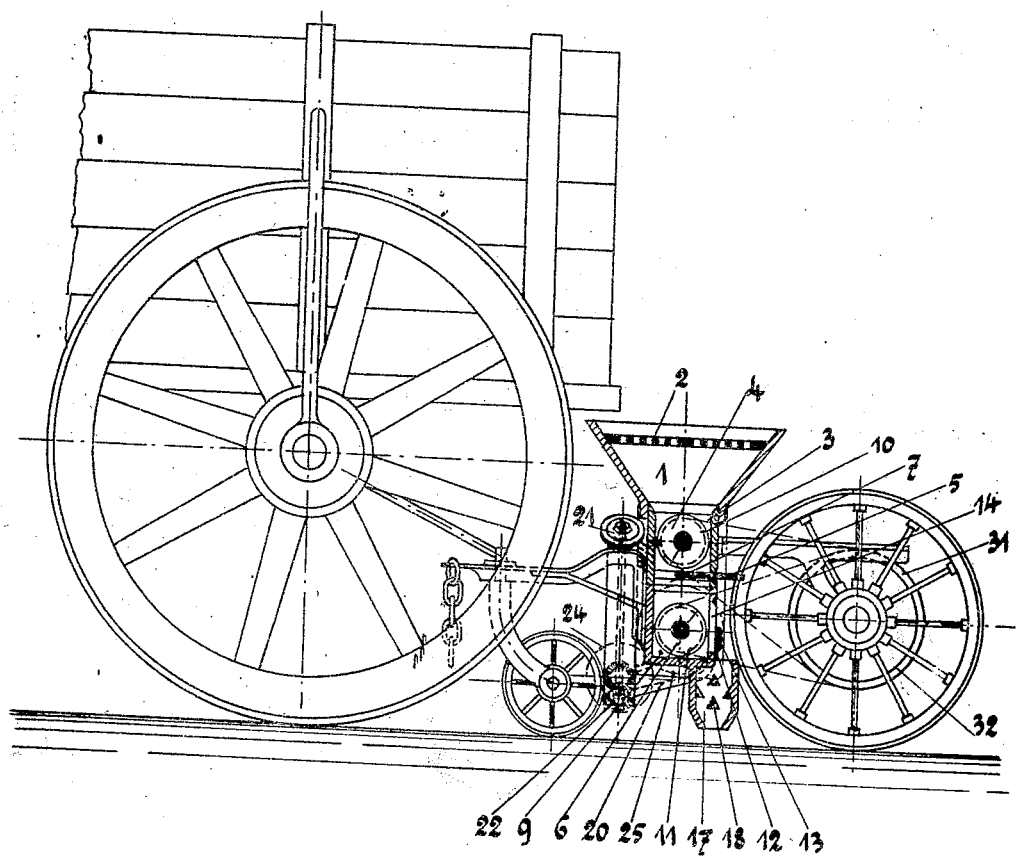
Figure 2:
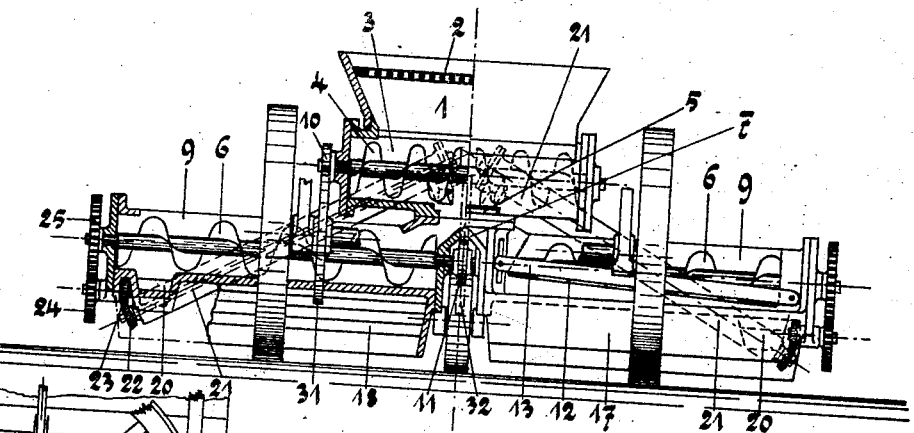
Figure 3:
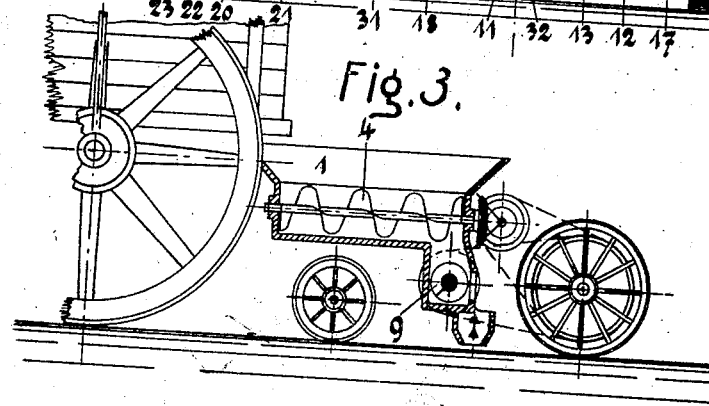
Figure 5:
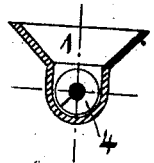
Figure 4:

In said drawings:—Figure 1 shows a side view of a part of the vehicle, the distributing mechanism being partly in section. Fig. 2 shows a back view of the vehicle partly in section. Fig. 3 shows a special construction of the worm of the hopper. Fig. 4 shows a detail view of the discharge hopper or distributer. Fig. 5 shows a cross-section through the inlet hopper shown in Fig. 3.

The hopper 1 is closed at the top by a sieve 2 in order to separate the manure from solid bodies as stones or the like, before it enters into the inlet hopper and into the distributing mechanism. The manure thus sifted enters a horizontal receptacle 3, which incloses a worm or endless screw 4, consisting of two parts one of which is left-threaded while the other one is right-threaded or reverse. This worm serves for the purpose of continuously moving the material introduced through the broad hopper 1 and thereby prevents the same from loading in front of the shut-off slide 5 thereby regulating the uniform feeding of the manure onto the lower distributing worm 6. In the passage between the upper and lower worms I place a cone-shaped roofed partition 7 so dividing the passage into two separate channels which run into a horizontally placed receptacle 9. The driving of the worm 4 is caused by means of a driving wheel 10 arranged outside of the receptacle 3 and actuated by a wheel 31 mounted on the axle of the vehicle and a sprocket chain. The proportion of the gear wheel depends on the size of the worm used. Before the material is uniformly distributed by the partition 7 into the two channels it must pass a shut-off slide 5 by which the quantity of the manure entering the lower receptacle is regulated, the slide being so arranged as to always open and close the channel uniformly.

The cone-shaped partition 7 is situated exactly in the center of the machine so that it covers a driving wheel 11 of the worm 6, the worm 4 as left-and right-hand threaded. The wheel 11 is actuated by the driving wheel 31 mounted on the axle of the vehicle through sprocket and chain gear. While the upper worm 4 is employed to press the material towards a certain point I use the lower worm to again spread the material over the whole surface of the receptacle 9 and to effect the uniform distribution of the manure.

The manure is equally fed over the wall 12 and completely uniformly distributed over the ground. In order to prevent an uneven distribution of the manure on the ground in consequence of the diminishing pressure reduced towards the ends of the hollow receptacle 9, I provide the overflow wall 12 with a specially adjustable overflow bar 13 and located in such a manner that the center part of said overflow wall is higher than its ends. If very fine manure is used I adjust the opening between wall and top of the receptacle thus as to form a narrow slot through which the manure passes.

Below the overflow wall 12 I provide a discharge hopper a distributer 17 the length of which corresponds to the length of the two worms. Inside said hopper are single distributing rods or fall interrupters 18, which the material has to pass, whereby it insures a still greater uniformity of distribution. The machine as hereinbefore described shall only be used to distribute manure over large surfaces or broadcast.

If the manure is to be distributed in rows I remove the rods 18 and replace the same by single sloping partitions 19, see Fig. 4, which are placed apart at certain distances according to the rows. In the use of the construction, shown in Fig. 4, I place two worms below the hopper 1. The worms one of which is left-hand threaded, while the other one is right-hand threaded are mounted at right angles to the direction of the movement of the vehicle and push the fed material to the back, where it passes through an opening over the partitions 7 whereupon it enters the receptacle 9.

In order to prevent clogging or other possible impediments of the work caused by overfilling of the machine I provide on the two outer ends of the receptacle 9 an opening which runs into an open casing 20, which receives the residue of the material. From here the material is returned by a small worm of an endless screw 21 into the lower distributing worm receptacle 9. The worm 21 is driven from the shaft of the worm 6 by means of bevel or spur wheels 22, 23, 24, 25.

The end plates of the two receptacles 3 and 9 as well as two parallel side-walls of the partition 7 form bearings, as they carry the inner ends of the two worms. The manure distributing machine is attached to a manure cart traveling in front.

What I claim as new and desire to secure by United States Letters Patent is:—

1. In a machine for distributing manure the combination of a hopper, a receptacle below the said hopper, a worm of an endless screw placed in said receptacle, means to drive said worm from the axle of the vehicle, a second receptacle, a passage between the first and second receptacles, a roof shaped partition mounted in said passage to form two channels, a second worm of an endless screw, a side-wall of the second receptacle with an overflow opening on its top, and a discharge hopper, substantially as set forth.

2. In a machine for distributing manure in combination, a hopper, a receptacle below said hopper, a worm of an endless screw placed in said receptacle, means to drive said worm from the axle of the vehicle, a second receptacle, a passage between the first and second receptacles, a roof shaped partition mounted in said passage to form two channels, a second worm of an endless screw, a side wall of the second receptacle with an adjustable overflow opening on its top, and a discharge hopper, substantially as set forth.

3. In a machine for distributing manure the combination of a hopper, a receptacle below said hopper, a worm of an endless screw placed in said receptacle, means to drive said worm from the axle of the vehicle, a second receptacle, a passage between the first and second receptacles, a roof shaped partition mounted in said passage to form two channels, a second worm of an endless screw, a side wall of the second receptacle, an overflow opening on its side, an adjustable bar mounted on said side wall to lower the ends or raise the center of said overflow bar, and a discharge hopper, substantially as set forth.

4. In a machine for distributing manure the combination of a hopper, a receptacle below said hopper, a worm of an endless screw placed in said receptacle, means to drive said worm from the axle of the vehicle, a second receptacle, a passage between the first and second receptacles, a roof shaped partition mounted in said passage to form two channels, a second worm of an endless screw, a side wall of the second receptacle, an overflow opening on its side, an adjustable bar mounted on said side wall to lower the ends or raise the center of said bar, a discharge hopper, and sloping partitions in said discharge hopper, substantially as set forth.

5. In a machine for distributing manure, the combination of a hopper, a receptacle below the hopper, a worm of an endless screw placed in said receptacle, means to drive said worm from the axle of the vehicle, an opening in each of the two end-plates of said receptacle, two open casings mounted on the sides of said receptacle and communicating with the same by said openings, means to forward the manure collected in the casings to a second receptacle, a passage between the first and second receptacles, a second worm of an endless screw in said second receptacle, and means to discharge the manure, substantially as set forth.

6. In a machine for distributing manure, the combination of a hopper, a receptacle below the hopper, two worms of an endless screw in said receptacle mounted in the lengthwise direction of the vehicle, means to drive said worms in opposite directions from the axle of the vehicle, a second receptacle, a passage between the first and second receptacle, a second worm of an endless screw mounted in said second receptacle, and means to discharge the manure, substantially as set forth.

In testimony whereof I have hereunto set my hand in presence of two subscribing witnesses.

PAUL GRUNDMANN.

Witnesses:
PAUL E. SCHILLING,
FRANZ WEIDL.